(12) United States Patent
Budleski

(10) Patent No.: US 11,339,920 B2
(45) Date of Patent: May 24, 2022

(54) OUTDOOR PLATFORM FLOORING ATTACHMENT DEVICE

(71) Applicant: William Frank Budleski, Raleigh, NC (US)

(72) Inventor: William Frank Budleski, Raleigh, NC (US)

(*) Notice: Subject to any disclaimer, the term of this patent is extended or adjusted under 35 U.S.C. 154(b) by 0 days.

(21) Appl. No.: 17/157,587

(22) Filed: Jan. 25, 2021

(65) Prior Publication Data

US 2021/0215292 A1 Jul. 15, 2021

Related U.S. Application Data

(63) Continuation of application No. 16/793,407, filed on Feb. 18, 2020, now Pat. No. 10,907,766, which is a continuation of application No. 16/406,060, filed on May 8, 2019, now Pat. No. 10,563,815, which is a continuation of application No. 15/924,391, filed on Mar. 19, 2018, now Pat. No. 10,323,788, which is a continuation of application No. 14/203,061, filed on Mar. 10, 2014, now abandoned.

(60) Provisional application No. 61/782,618, filed on Mar. 14, 2013.

(51) Int. Cl.
*F16M 13/02* (2006.01)
*A47B 91/08* (2006.01)

(52) U.S. Cl.
CPC ............. *F16M 13/02* (2013.01); *A47B 91/08* (2013.01)

(58) Field of Classification Search
CPC combination set(s) only.
See application file for complete search history.

(56) References Cited

U.S. PATENT DOCUMENTS

| 2,935,118 | A | * | 5/1960 | Meilleur | A47C 7/48 297/124 |
|---|---|---|---|---|---|
| 3,381,925 | A | | 5/1968 | Higuchi | |
| 3,601,919 | A | * | 8/1971 | Nixon | A01K 97/10 43/21.2 |
| 4,235,409 | A | | 11/1980 | Cummings | |
| 4,297,963 | A | | 11/1981 | Beacom | |
| 4,759,654 | A | | 7/1988 | Martin | |
| 4,803,794 | A | * | 2/1989 | Lopez | A01K 97/10 248/538 |
| 5,120,016 | A | | 6/1992 | Dysarz | |
| 5,542,367 | A | | 8/1996 | DuBois, III | |
| 5,566,495 | A | | 10/1996 | Kim | |
| 5,625,974 | A | | 5/1997 | Demaio | |
| 5,632,112 | A | | 5/1997 | Steinborn | |
| 5,690,042 | A | | 11/1997 | Bentley | |

(Continued)

*Primary Examiner* — Monica E Millner
(74) *Attorney, Agent, or Firm* — Olive Law Group PLLC

(57) ABSTRACT

An apparatus is provided. The apparatus includes a blade configured for extending between adjacent floor panels and having a bottom portion thereof that defines a floor member engaging recess for engaging a bottom side of the floor member and a hook on an end thereof for engaging a vertical side of the floor member. A mount to which the blade is translatable about and engaged with a top surface of the adjacent floor panels when installed on a floor surface is provided. A linear translator is selectively directed to translate the blade relative to the mount such that the distance between a bottom surface of the mount and the floor member engaging recess is varied in order to securely receive the floor member therebetween. A related method is also disclosed.

5 Claims, 7 Drawing Sheets

(56) References Cited

U.S. PATENT DOCUMENTS

| | | |
|---|---|---|
| 5,813,163 A | 9/1998 | Dysarz |
| 5,873,319 A | 2/1999 | Bentley |
| 5,895,017 A | 4/1999 | McMillan, Jr. |
| 5,967,075 A | 10/1999 | Johansen |
| 6,015,139 A | 1/2000 | Weber |
| 6,497,067 B1 | 12/2002 | King |
| 6,647,911 B1 | 11/2003 | Solterbeck |
| 6,769,375 B1 | 8/2004 | Caporella |
| 6,955,330 B1 | 10/2005 | Weiser |
| 7,156,357 B1 | 1/2007 | Kocur |
| 7,575,215 B1 | 8/2009 | Clark |
| 8,327,575 B1 | 12/2012 | Zalewski |
| 10,323,788 B2 | 6/2019 | Budleski |
| 2002/0145092 A1 | 10/2002 | Davies |
| 2011/0079700 A1* | 4/2011 | Hilderbrand ........... A47C 7/002 |
| | | 248/499 |

* cited by examiner

OUTDOOR PLATFORM FLOORING ATTACHMENT DEVICE

CROSS-REFERENCE TO RELATED APPLICATIONS

This application is a continuation of U.S. patent application Ser. No. 16/793,407, filed on Feb. 18, 2020, which is a continuation of U.S. patent application Ser. No. 16/406,060 filed on May 8, 2019, being issued as U.S. Pat. No. 10,563,815 on Feb. 18, 2020, which is a continuation of U.S. patent application Ser. No. 15/924,391 filed on Mar. 19, 2018, now U.S. Pat. No. 10,323,788 issued on Jun. 18, 2019, which is a continuation of U.S. patent application Ser. No. 14/203,061 filed on Mar. 10, 2014, which claims priority to U.S. Provisional Patent Application No. 61/782,618 filed on Mar. 14, 2013, the contents of which are hereby incorporated by reference herein.

BACKGROUND OF THE INVENTION

The present invention relates to attaching items to outdoor flooring. Specifically, it relates to a device for attaching to the joists of outdoor flooring for attaching a selected item to the top of an outdoor flooring surface.

A number of different types of outdoor raised platform flooring exist. For example, decks, decks attached to buildings, wharfs, docks, piers and the like all consist of plank wood type flooring secured to flooring joists that are at an angle, essentially perpendicular to the floor planks. They are raised above the ground for a number of reasons including matching exits from buildings, providing a level walkway, providing a walkway above water and the like. In construction, a series of joists are constructed in parallel in a first direction by attaching to pylons and floor boards are laid across the joists. Frequently, there is spacing between the boards to allow for drainage and to allow the boards to not accumulate water and to dry easier after it rains.

Outdoor flooring suffers from all the ills of being outside including sun, wind and rain. The wind is especially difficult to deal with if items such as stands, grills, chairs, tables or the like are to sit on the flooring since strong gusts of wind can move or even turn over items not securely fasted or heavy enough to resist the wind. Items can be permanently nailed to the flooring but they cannot easily be removed and cause permanent damage to the flooring, (e.g. by screws or the like). Having a device that could be used to fix an item to a deck that can easily be removed would be useful.

BRIEF SUMMARY OF THE INVENTION

The present invention relates to the discovery that a device that slips between the floor planks and locks onto the floor joists allows one to attach items to the device and hold them in place while freely being able to disengage and remove the device to move the item to a different location as long as it is a place where the device can attach to a joist.

Accordingly, an apparatus is provided herein that includes a first blade configured for extending between adjacent floor panels and having a bottom portion thereof that defines a floor member engaging recess for engaging a bottom side of the floor member and a hook on an end thereof for engaging a vertical side of the floor member, a mount to which the first blade is translatable about and engaged with a top surface of the adjacent floor panels when installed on a floor surface, and a linear translator that is selectively directed to translate the first blade relative to the mount such that the distance between a bottom surface of the mount and the floor member engaging recess is varied in order to securely receive the floor member therebetween.

According to one or more embodiments, the linear translator is a threaded rod and rotation of the threaded rod imparts movement of the rod relative to the base to thereby translate the first blade relative to the mount.

According to one or more embodiments, the mount defines a slot through which the first blade passes through.

According to one or more embodiments, the first blade defines a flange at a top portion thereof that extends above the mount when installed therein and the linear translator extends through the flange and into engagement with the mount.

According to one or more embodiments, the linear translator is positioned above the mount and translates the first blade by imparting movement of the translator against the mount to thereby translate the first blade relative to the mount. Alternatively, the linear translator can be attached to the mount or on the vertical pole pipe tubing.

According to one or more embodiments, the mount is in engagement with an umbrella.

According to one or more embodiments, the apparatus includes a second blade configured for extending between adjacent floor panels and having a bottom portion thereof that defines a floor member engaging recess for engaging a bottom side of the floor member and a hook on an end thereof for engaging a vertical side of the floor member and a linear translator that is selectively directed to translate the blade relative to the mount such that the distance between a bottom surface of the mount and the floor member engaging recess is varied in order to securely receive the floor member therebetween.

According to one or more embodiments, the first blade and the second blade are configured for engaging the same floor member.

According to one or more embodiments, the first blade and the second blade are radially spaced-apart when installed in the mount.

According to one or more embodiments, the first blade and the second blade are respectively engaged with different floor members.

According to one or more embodiments, the different floor members are spaced-apart floor joists.

According to one or more embodiments, the floor member is a floor joist and the floor member engaging recess receives the floor joist therebetween.

According to one or more embodiments, a method is provided. The method includes placing a first blade between adjacent floor panels and extending the first blade such that a floor member engaging recess of the hook is in engagement with a bottom side of the floor member and a hook is in engagement with a vertical side of a floor member, placing a mount into translatable engagement with the first blade and onto a top surface of the adjacent floor panels, and translating the first blade relative to the mount such that the distance between a bottom surface of the mount and the floor member engaging recess is varied in order to securely receive the floor member therebetween.

According to one or more embodiments, the linear translator is a threaded rod. The method also includes rotating the threaded rod to impart movement of the rod relative to the base to thereby translate the blade relative to the mount.

According to one or more embodiments, the method includes placing the blade through the slot and between adjacent floor panels.

According to one or more embodiments, the method includes engaging an umbrella with the mount.

According to one or more embodiments, the method includes placing a second blade between adjacent floor panels and extending the second blade such that a floor member engaging recess of the hook is in engagement with a bottom side of the floor member and a hook is in engagement with a vertical side of a floor member, placing a mount into translatable engagement with the second blade and onto a top surface of the adjacent floor panels, and translating the second blade relative to the mount such that the distance between a bottom surface of the mount and the floor member engaging recess is varied in order to securely receive the floor member therebetween.

According to one or more embodiments, the method includes engaging the first blade and the second blade with the same floor member.

According to one or more embodiments, the method includes engaging the first blade and the second blade with spaced-apart floor members.

DETAILED DESCRIPTION OF THE INVENTION

Figure 1:
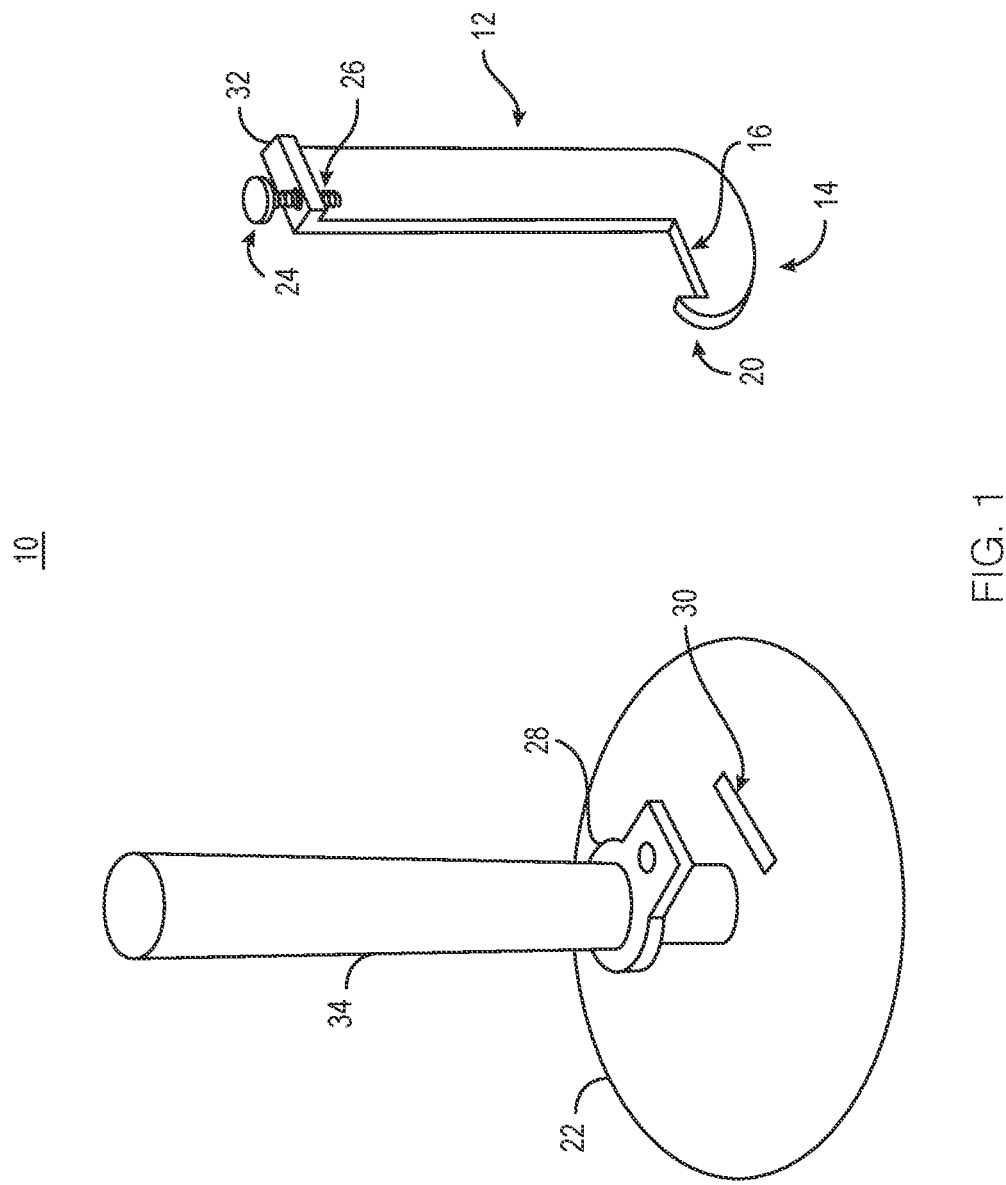
FIG. 1 illustrates a perspective view of an apparatus according to one or more embodiments disclosed herein.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

As used herein the term "adjacent floor panels" refers to floor boards used for outdoor flooring that are mounted to essentially perpendicular joists. While adjacent floor panels can be spaced apart or touching on their longitudinal edge, typical outdoor floor planks are spaced about 1/16 of an inch to about 3/8 of an inch. The mounting device blade portion can be slipped in-between two adjacent planks. Where the spacing is not enough removal of a portion of the adjacent planks to allow the insertion of the blade is necessary.

As used herein the term "outdoor floor platform" refers to outdoor flooring planks that are mounted on one or more essentially perpendicular joist members. Joists are well known in the art for outdoor platforms and are typically raised up and mounted on pylons to give support at a desired height. Joists will all have a bottom. Typically a joist bottom is a flat horizontal surface (e.g. a 2 by 10 turned on its edge) which is used in the present invention to attach the mounting device. Examples of outdoor floor platforms include decks, decks attached to buildings, wharfs, docks, piers, and the like.

Figure 2:
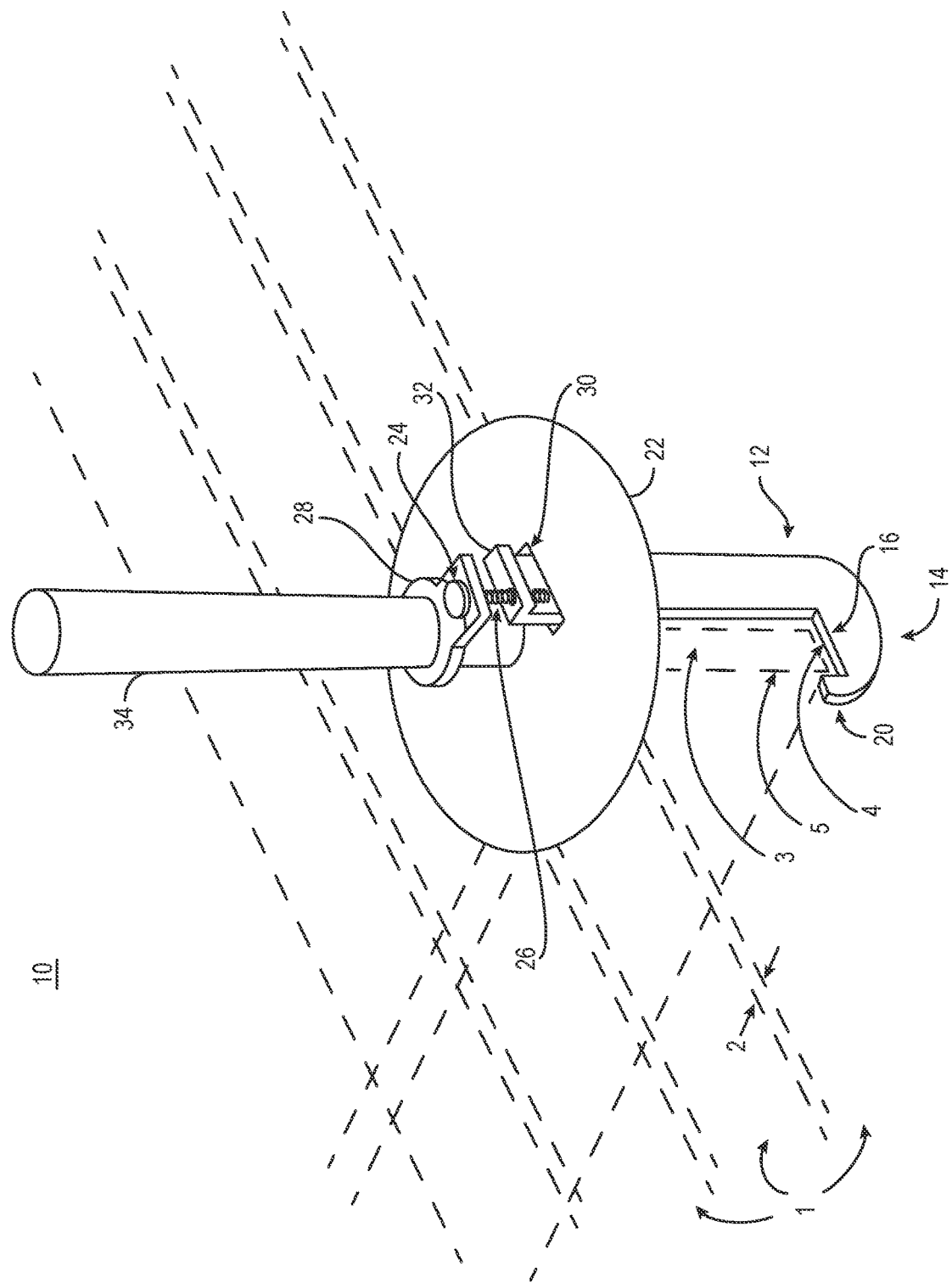
FIG. 2 illustrates a partially exploded, perspective view of an apparatus according to one or more embodiments disclosed herein.
Figure 3:
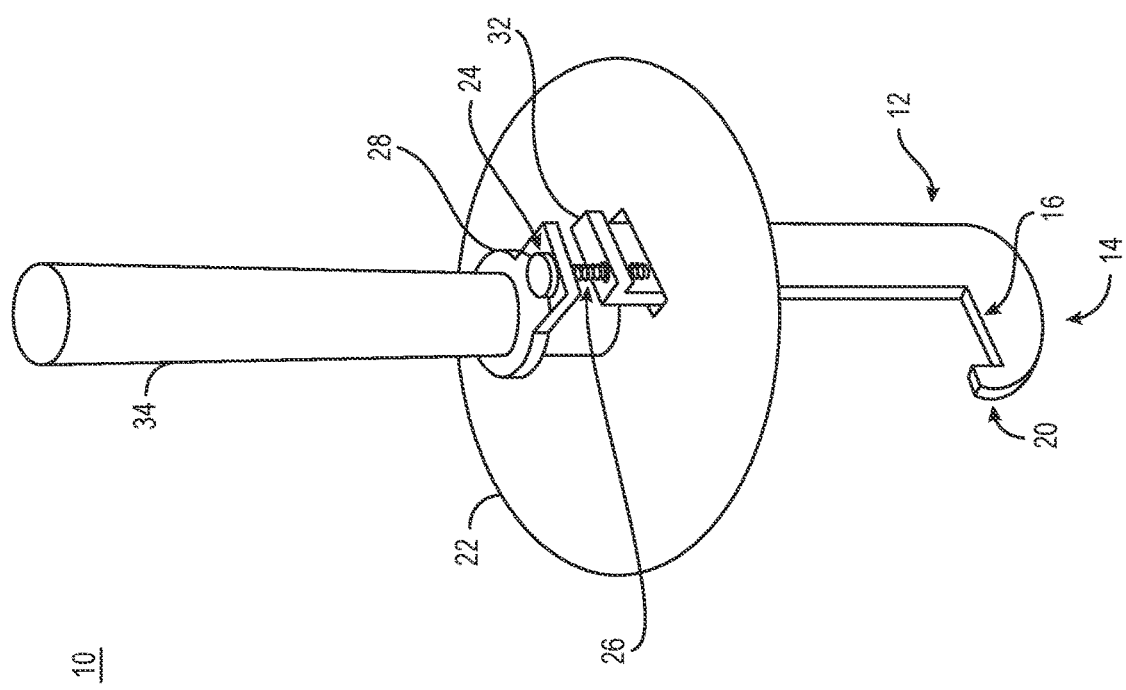
FIG. 3 illustrates a perspective assembled view of an apparatus according to one or more embodiments disclosed herein.

Now referring to drawings, an apparatus generally designated 10 is illustrated in FIG. 1 in an installed position, FIG. 2 in an exploded view, and FIG. 3 in an assembled, but not installed position. The apparatus 10 includes a first blade 12 that is configured for extending between adjacent floor panels 1. As used herein, adjacent floor panels may include adjacent floor planks as one might find on a deck or similar structure. Typically, adjacent floor panels 1 will be installed such that a gap 2 is defined therebetween. This gap 2 allows for expansion of the floor panels 1 and allows for flow-through of liquid, such as during a rainstorm or other precipitation for an outdoor porch as one example.

The first blade 12 may be preferably configured for sliding in between the adjacent floor planks 1 within gap 2. In this manner, the first blade 12 may be generally flat and may have a dimensional thickness of between one-sixteenth and three-sixteenths of an inch in one or more embodiments. The first blade 12 may be formed from metal and may be press formed or otherwise machined. The first blade 12 may also be formed of plastic or some composite material. The first blade 12 may be the only blade in apparatus 10 as illustrated in FIG. 1. The first blade 12 may have a bottom portion 14 thereof that generally extends in the direction that the floor planks 1 run when the blade 12 is installed. The bottom portion 14 may define a floor member engaging recess 16 for engaging a bottom side 4 of a floor member 3. In the one or more embodiments illustrated in FIG. 1, the floor member 3 is a floor joist that is provided for supporting the adjacent panels 1 to form a floor surface. The floor member 3 may be any appropriately configured floor member to which the first blade 12 is configured for engaging with. The first blade 12 may define a hook 20 on an end thereof for engaging a vertical side 5 of the floor member 3. This advantageously provides engagement of the blade 12 with each of a vertical surface 3, 6 of the floor member 3 and a horizontal surface 4 of the floor member 3. In this manner, engagement of blade 12 causes restriction of movement and support in each of two directions.

The apparatus 10 further includes a mount 22 to which the first blade 12 is translatable about. The mount 22 is shown as a cylindrical or dome shape, but may take on any appropriate configuration. The mount 22 may be engaged with a top surface of the adjacent floor panels 1 when installed on a floor surface. In this manner, the mount 22 rests on the floor surface when it is in an installed position. The mount 22 may define a slot 30 through which the first blade 12 passes through.

A linear translator 24 is selectively directed to translate the first blade 12 relative to the mount 22 such that the distance between a bottom surface of the mount 22 and the floor member engaging recess 16 is varied in order to securely receive the floor member 3 therebetween. In this manner, and as better illustrated in FIG. 4, a gap "G" is formed between a bottom surface 4 of the floor member 3 and the floor member engaging recess 16 after the first blade 12 is positioned about the floor member 3.

As illustrated, the linear translator 24 may be a threaded rod 26 that is carried by the blade 12 and a collar 28 that engages an accessory or accessory mount. Rotation of the threaded rod 26 causes movement of the rod 26 relative to the blade 12, thus imparting upward movement of the blade 12. For example, if the threaded rod 26 is a right hand threaded fastener, clockwise rotation of the threaded rod 26 causes downward movement of the threaded rod 26 relative to the blade 12 because a corresponding threaded recess on a flange 32 receives the linear translator 24 such that the blade 12 is translated upwards as the threaded rod 26 passes therethrough. In the embodiment illustrated in FIG. 4, further rotation of threaded rod 26 imparts further upward movement of blade 12 until the gap does not exist between the floor member engaging recess 16 and the bottom surface 4 of the floor member 3. In this manner, the blade 12 has encased portions 4, 5, and 6 of floor member 3 and constrained movement of apparatus 10 relative to the floor. In one or more embodiments, the first blade 12 defines flange 32 at a top portion thereof that extends above the mount 22 when installed therein and the linear translator 24 extends through the flange 32 and into non vertical translatable engagement with collar 28. In one or more embodiments, the end of the linear translator 24 is further engaged with the mount 22 to add structural stability. Any appropriate configuration in which a linear translator may be used to impart upward movement of blade 12 may be employed herein.

Figure 7:
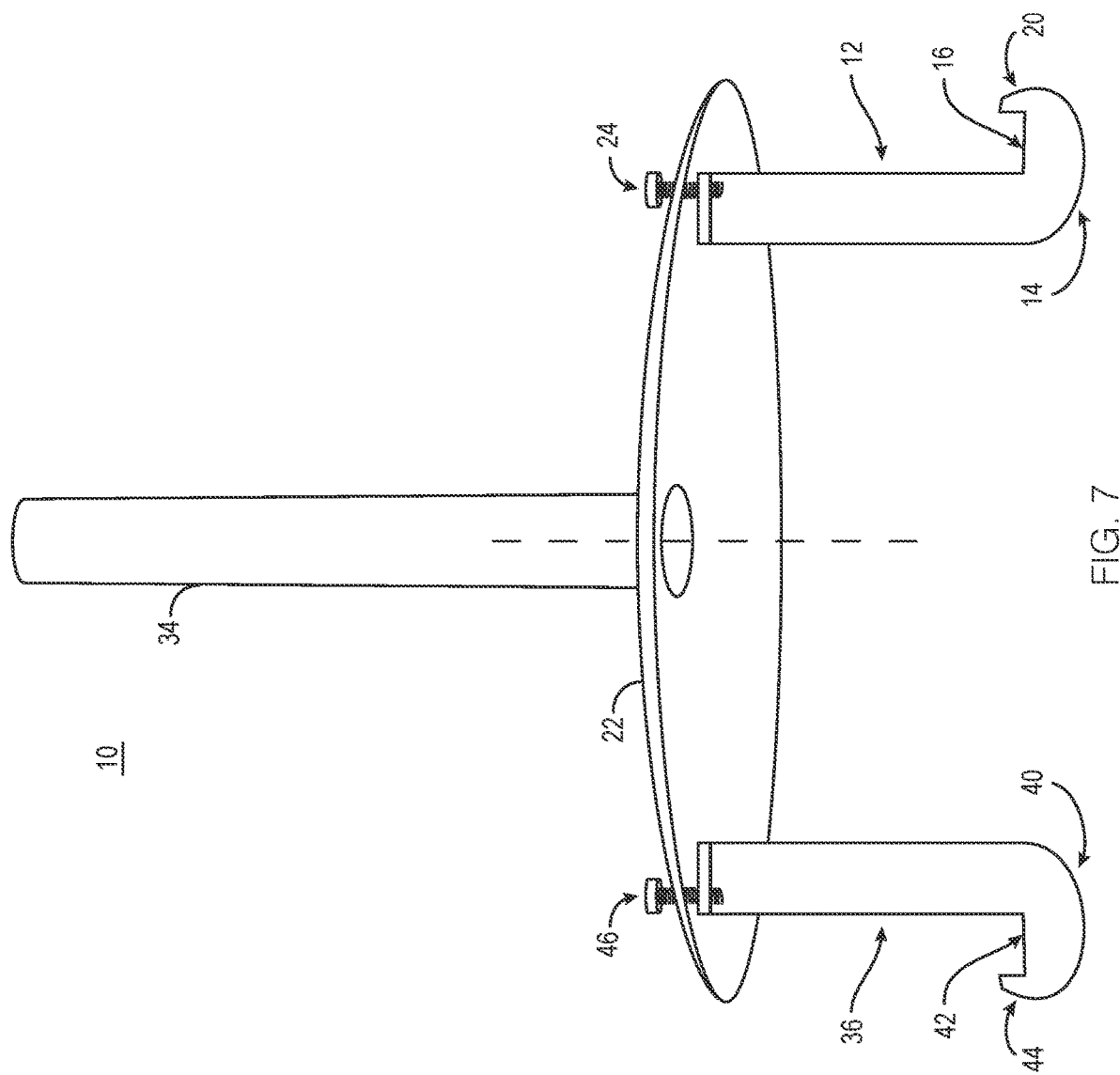
FIG. 7 illustrates a perspective view of an apparatus according to one or more embodiments disclosed herein.

Linear translator 24 is illustrated in one particular embodiment shown in the figures and described herein with reference to those figures. However, linear translator 24 may be any appropriately configured translator capable of imparting linear translation to blade 12. For example, linear translator 24 may be a slide washer, a clamping mechanism, a pulling mechanism that receives a pin for locking in place, and the like. Linear translator could be a threaded fastener extending out of mount 22 and into engagement with blade 12. Alternatively, linear translator could be a threaded fastener extending through mount 22 and into engagement with blade 12 as illustrated in FIG. 7.

Blade 12 is shown having one "hook" assembly extending from one side thereof, though in appropriate embodiments, hook assemblies may extend from opposing sides of the blade, with the second hook having one or more characteristic different from the first hook. For example, the second hook could have a different spacing or be placed at a different height than that of the first hook.

The apparatus 10 described herein is particularly useful for engaging with an umbrella support 34 or other accessory device likely to be found on a porch or other outdoor surface. In this manner, when wind or some other force acts upon the umbrella or other accessory device, the apparatus 10 acts to maintain the umbrella or other device in a secured and safe state.

Removal of apparatus 10 about a floor surface is accomplished by loosening linear translator 24 such that gap G returns and the first blade 12 is no longer in engagement with floor member 3.

Figure 6:
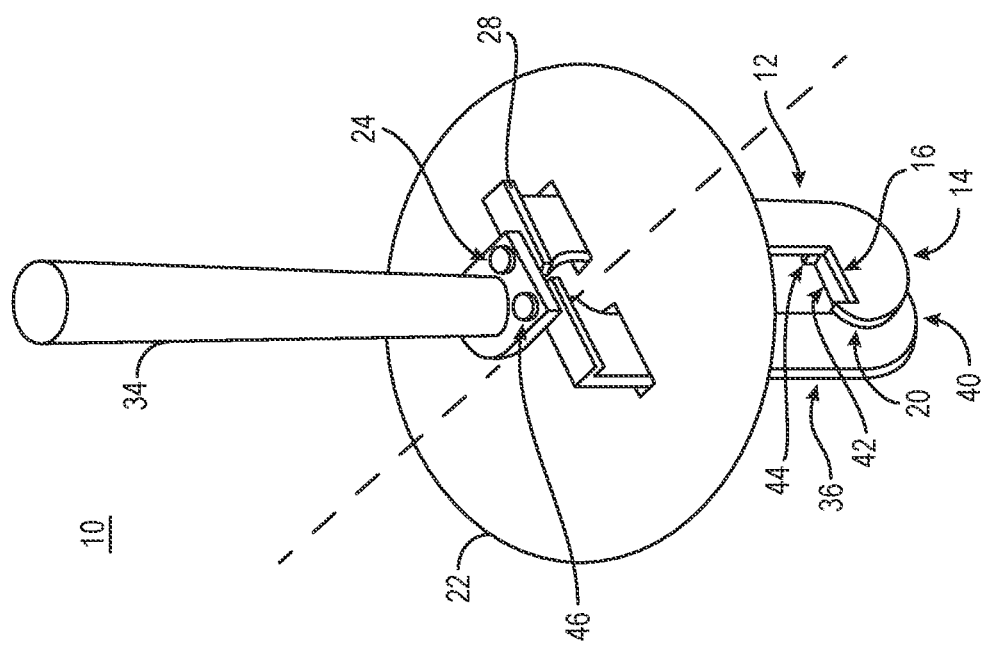
FIG. 6 illustrates a perspective view of an apparatus according to one or more embodiments disclosed herein.

One or more alternate embodiments for apparatus 10 are illustrated in FIG. 6 in which a second blade 36 is provided. Second blade 36 also defines a bottom portion 40 that includes a floor member engaging recess 42 and a hook 44. A linear translator 46 may also be provided for translating the second blade 36 in a manner like that described with reference to first blade 12.

In the embodiment illustrated in FIG. 6, the blades 12 and 36 are generally facing inward and are configured for engaging the same floor member. In this manner, the blades 12 and 36 may be provided for engaging the same floor joist. As illustrated, the blades 12 and 36 are radially spaced-apart on opposing sides of the mount 22, though the blades 12 and 36 could be more or less spaced-apart. Additionally, blades 12 and 36 may be offset circumferentially relative to a centerline (shown as the dashed line extending across mount 22) so that the respective engaging portions (16 for blade 12 and 42 for blade 36) are aligned about the floor member 3, which may be a floor joist in one or more embodiments. Alternatively, blades 12 and 36 could be more or less spaced apart or radically spaced apart (shown along the dashed line extending across mount 22) on opposing sides of mount 22.

In the embodiment illustrated in FIG. 7, the blades 12 and 36 are generally facing outward and are configured for engaging different, spaced-apart floor members. In this manner, the blades 12 and 36 may be provided for engaging adjacent floor joists, such as, for example, floor joists that are 16 inches or 24 inches "off-center". As illustrated, the blades 12 and 36 are radially spaced-apart on opposing sides of the mount 22, though the blades 12 and 36 could be more or less spaced-apart. Additionally, blades 12 and 36 may be offset circumferentially relative to a centerline (shown as the dashed line extending across mount 22) so that the respective engaging portions (16 for blade 12 and 42 for blade 36) are aligned about the respective floor joist that is desired to be engaged. In this embodiment, mount 22 may be larger or elongated relative to the embodiments illustrated in FIGS. 1 through 5.

In one or more embodiments, one or more methods of using the one or more apparatuses disclosed in FIGS. 1 through 7 are disclosed herein. One or more methods may include placing a first blade between adjacent floor panels. The first blade may be blade 12 as described herein. The first blade 12 may be positioned between adjacent floor panels separate from mount 22, meaning installed under the floor panel 1 first and then inserted up through the spacing between adjacent panels and engaged with mount 22, or may be engaged with mount 22 and then engaged with the floor panels 1. Slot 30 may be provided sufficiently over-sized relative to the shank portion of blade 12 such that blade 12 can be tilted at non-orthogonal angles relative to mount 22 in order to secure blade 12 to floor member 3. The one or more methods may include extending the first blade 12 such that a floor member engaging recess of the blade is in engagement with a bottom side of the floor member and a hook is in engagement with a vertical side of a floor member. The floor member engaging recess may be engaging recess 16 illustrated in any of FIGS. 1 through 7. The hook may be hook 20 illustrated in any of FIGS. 1 through 7. In one or more embodiments, blade 12 may be positioned through slot 30 defined in mount 22.

The one or more methods may include placing a mount into translatable engagement with the first blade 12. The mount may be mount 22 illustrated in any of FIGS. 1 through 7. The method may further include engaging the mount 22 onto a top surface of the adjacent floor panels.

Figure 4:
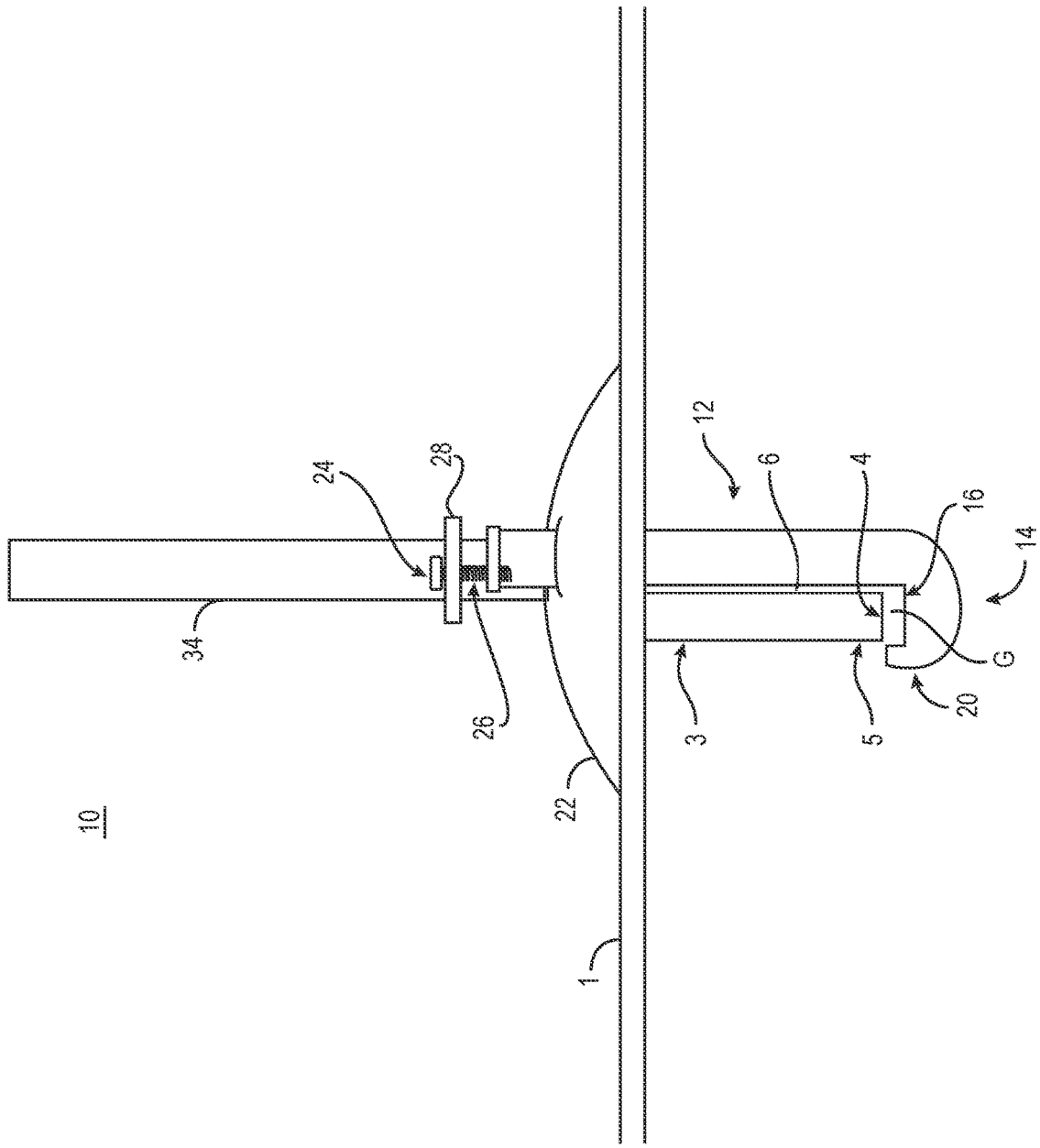
FIG. 4 illustrates a side view of the apparatus in a first, non-engaged position about a floor member according to one of more embodiments disclosed herein.
Figure 5:
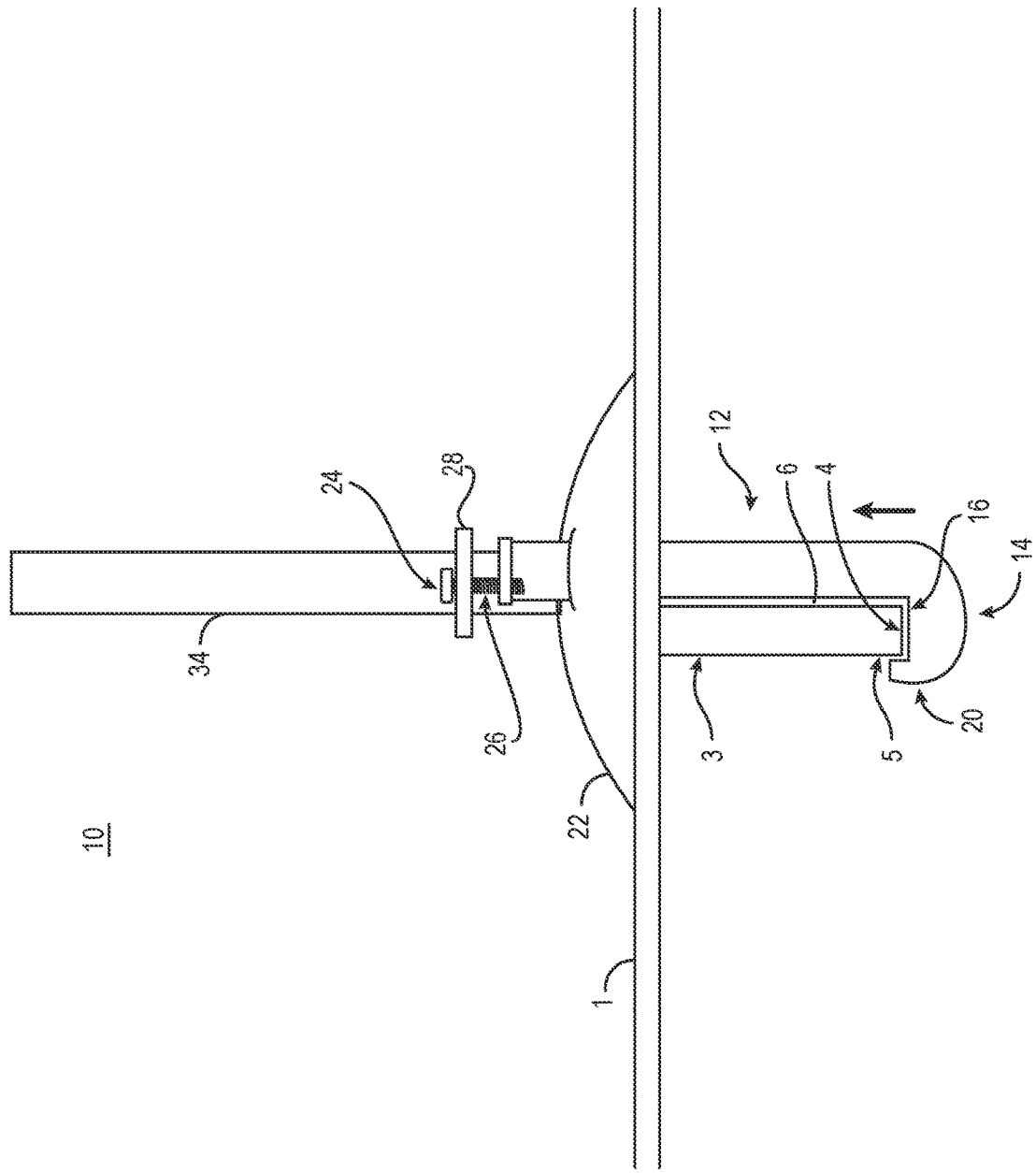
FIG. 5 illustrates a side view of the apparatus in a second, engaged position about a floor member according to one of more embodiments disclosed herein.

The one or more methods may include translating the first blade 12 relative to the mount 22 such that the distance between a bottom surface of the mount 22 and the floor member engaging recess 16 is varied in order to securely receive the floor member therebetween. In one or more embodiments in which the blade 12 is first secured to floor member 3, a gap "G" may be formed between the blade 12 and the floor member 3 as illustrated in FIG. 4. The method may include using a linear translator to translate the blade 12 relative to mount 22. The one or more methods may include engaging an umbrella 34 with the mount.

The one or more methods may also include placing a second blade between adjacent floor panels and extending the second blade such that a floor member engaging recess of the hook is in engagement with a bottom side of the floor member and a hook is in engagement with a vertical side of a floor member. The second blade may be blade 36. The method may include placing mount 22 into translatable engagement with the second blade 36 and onto a top surface of the adjacent floor panels 1. The method may include translating the second blade 36 relative to the mount 22 such that the distance between a bottom surface of the mount 22 and the floor member engaging recess 42 is varied in order to securely receive the floor member therebetween.

In one or more embodiments, the method may include engaging the first blade 12 and the second blade 36 with the same floor member 3, which may be a joist.

In one or more embodiments, the method may include engaging the first blade 12 and the second blade 36 with spaced-apart floor members, which may be spaced-apart floor joists.

On some floating docks as example wherein there is no space between the floor planks the blades can be of heavy thick bar stock metal and reach around the edge outer perimeter floor joist side to capture the bottom. The base bottom can be of toothed nature to prevent sliding as in example of an edge of dock mounting.

In one or more embodiments, any of the items herein may further include a cable, chain, or other locking/attaching member for attaching to a table, umbrella, or other device to prevent theft thereof, or environmental damage such as wind blowing the table, umbrella, or other device away.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. An apparatus for supporting an umbrella, chair, table, or boat cleat with respect to a structure characterized by a plurality of elongate floor panels arranged parallel to one another are separated by a gap along a supporting intersecting floor joist, the floor joist being arranged at a non-parallel angle to the panels, the joist further having a vertical depth characterized by a bottom side, the apparatus comprising:
   a first blade configured to be extended through and guided by the gap between two floor panels of the plurality of floor panels to a distance below the floor panels that is at least the vertical depth of the floor joist that extends below the floor panels, and the first blade further having a bottom portion thereof that defines a floor member engaging surface configured to engage the bottom side of the floor joist;
   a mount to which the first blade is translatable about and the mount is engaged with a top surface of the adjacent floor panels when installed on a floor surface; and
   a translator that is selectively directed to translate the first blade relative to the mount such that the distance between a bottom surface of the mount and the floor joist engaging surface is varied in order to securely receive the floor joist therebetween,
   wherein the translator extends above the floor panels engaging the mount when the apparatus is installed thereabout.

2. The apparatus of claim 1, wherein the translator is a linear translator is a threaded rod and rotation of the threaded rod imparts movement of the threaded rod relative to the mount to thereby translate the first blade relative to the mount.

3. The apparatus of claim 2, wherein the mount defines a slot through which the first blade passes through.

4. The apparatus of claim 3, wherein the first blade defines a flange at a top portion thereof that extends above the mount when installed therein, the linear translator extending through the flange.

5. The apparatus of claim 1, wherein the translator is positioned about the mount and translates the first blade by imparting movement of the first blade relative to the mount.

\* \* \* \* \*